(12) United States Patent
Flores-Cuadras

(10) Patent No.: US 11,539,112 B2
(45) Date of Patent: Dec. 27, 2022

(54) MEASURING INSTRUMENT WITH COUPLED ANTENNA

(71) Applicant: 2J ANTENNAS USA, CORPORATION, Chandler, AZ (US)

(72) Inventor: Javier Ruben Flores-Cuadras, Chandler, AZ (US)

(73) Assignee: 2J ANTENNAS USA, CORPORATION, Gilbert, AZ (US)

( * ) Notice: Subject to any disclaimer, the term of this patent is extended or adjusted under 35 U.S.C. 154(b) by 0 days.

(21) Appl. No.: 17/143,870

(22) Filed: Jan. 7, 2021

(65) Prior Publication Data

US 2021/0210835 A1 Jul. 8, 2021

Related U.S. Application Data

(60) Provisional application No. 62/957,945, filed on Jan. 7, 2020.

(51) Int. Cl.
*H01Q 1/22* (2006.01)
*H01Q 9/28* (2006.01)
*G01B 3/18* (2006.01)

(52) U.S. Cl.
CPC .............. *H01Q 1/225* (2013.01); *G01B 3/18* (2013.01); *H01Q 9/285* (2013.01)

(58) Field of Classification Search
CPC ...... H01Q 1/225; H01Q 9/285; H01Q 1/2283; H01Q 1/36; H01Q 9/40; H01Q 1/40; H01Q 1/38; H01Q 1/243; H01Q 9/42; H01Q 5/371; H01Q 9/0421; H01Q 1/48; H01Q 5/357; H01Q 5/364; H01Q 1/2291; H01Q 5/10; H01Q 5/30; H01Q 9/16; H01Q 1/085; H01Q 1/20; H01Q 5/335; H01Q 5/47; H01Q 13/085; H01Q 5/20; H01Q 5/25; H01Q 5/307; H01Q 5/385; H01Q 5/392; H01Q 5/40; H01Q 7/00; H01Q 9/0407; H01Q 1/42; H01Q 1/521; H01Q 1/526; H01Q 13/206; H01Q 21/068; H01Q 21/12; H01Q 21/26; H01Q 21/28; H01Q 21/30; H01Q 3/2617; H01Q 9/0414; H01Q 1/1207; G01B 3/18; G01B 3/004; G01B 3/04; G01B 3/563; G01B 3/566

See application file for complete search history.

(56) References Cited

U.S. PATENT DOCUMENTS

| 9,599,447 | B2 * | 3/2017 | Cruickshanks | ........ G01B 3/563 |
| 2009/0064517 | A1 * | 3/2009 | Sanderson | ............... G01B 3/04 33/494 |
| 2020/0106181 | A1 * | 4/2020 | Avser | ..................... H01Q 1/243 |

* cited by examiner

*Primary Examiner* — Andrea Lindgren Baltzell
(74) *Attorney, Agent, or Firm* — CP Law Group PC; Cy Bates

(57) ABSTRACT

A measuring instrument having an antenna element coupled to the measuring instrument is disclosed. The measuring instrument includes a planar substrate with an antenna connector coupled to the planar substrate and further coupled to the antenna element. At least a portion of the planar instrument comprises indicia wherein said indicia collectively forms the measuring instrument.

15 Claims, 5 Drawing Sheets

MEASURING INSTRUMENT WITH COUPLED ANTENNA

CROSS-REFERENCE TO RELATED APPLICATIONS

This application claims benefit of priority with U.S. Provisional Application Ser. No. 62/957,945, filed Jan. 7, 2019; the entire contents of which are hereby incorporated by reference.

BACKGROUND

Field of the Invention

This invention relates to a measuring instrument; more particularly, a measuring instrument with an antenna coupled therewith.

Description of the Related Art

Using a variety of tools is common practice for engineers during design and testing. Such tools may include measuring instruments such as rulers, protractors, set squares, and other measuring instruments for providing a measurement function. Another tool that is especially common with electrical engineers is an antenna for transmitting and/or receiving radio waves in conjunction with a transmitter and/or receiver. Antennas can be used for measuring the performance of said transmitter/receiver. Searching for one of the multiple tools the engineer may need can easily waste time. In addition, having to carry all of the multiple tools at once can be burdensome.

There is a need for a tool that is capable of providing multiple functions in a convenient manner.

SUMMARY

The disclosure concerns a measuring instrument having an antenna element coupled to the measuring instrument. The measuring instrument comprises a planar substrate with an antenna connector coupled to the planar substrate and further coupled to the antenna element. At least a portion of the planar instrument comprises indicia wherein said indicia collectively forms the measuring instrument.

Other advantages and benefits may be appreciated from the appended detailed descriptions.

BRIEF DESCRIPTION OF THE DRAWINGS

Other features, combinations, and embodiments will be appreciated by one having the ordinary level of skill in the art of measurement instruments and accessories upon a thorough review of the following details and descriptions, particularly when reviewed in conjunction with the drawings, wherein.

DETAILED DESCRIPTION

Figure 1:
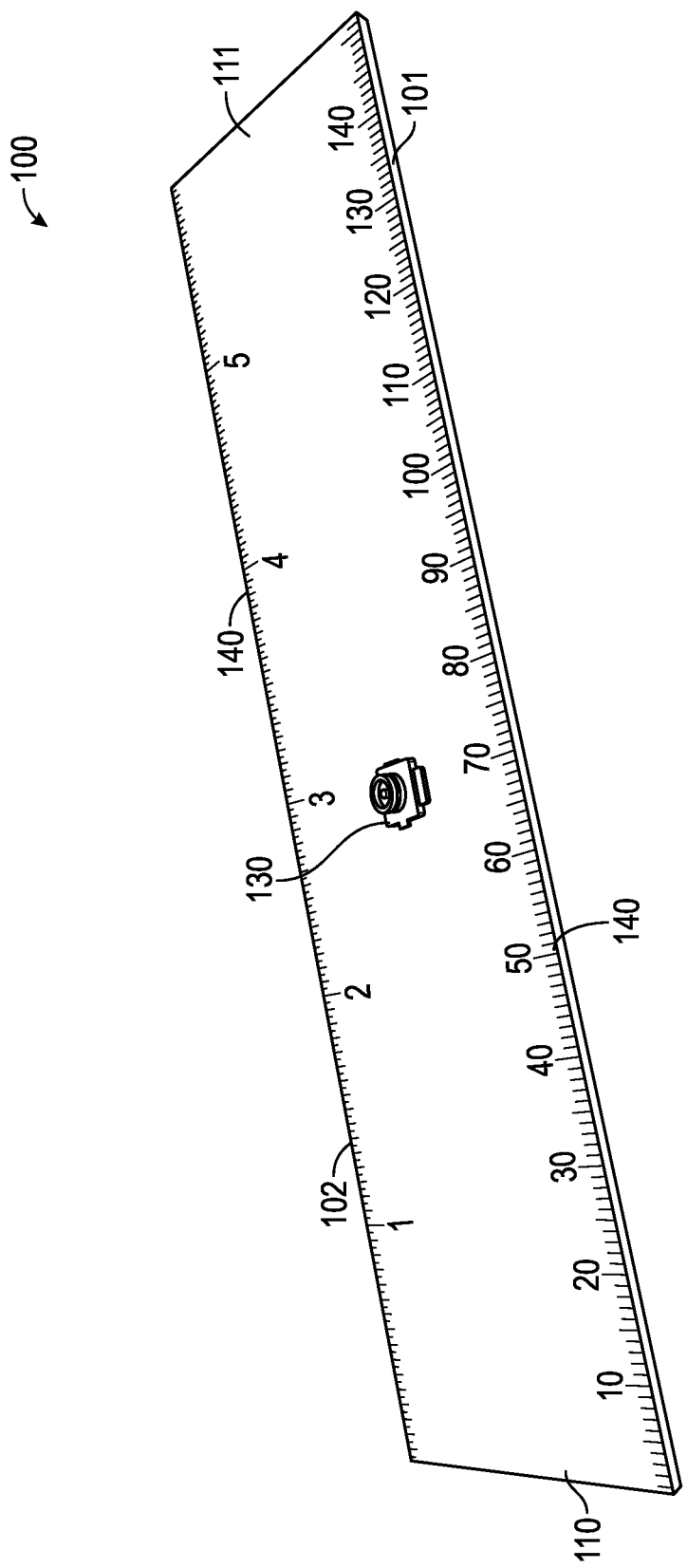
FIG. 1 shows a perspective view of a measuring instrument in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having ordinary skill in the art upon a thorough review of the instant disclosure. Accordingly, any reviewer of the instant disclosure should interpret the scope of the invention only by the claims, as such scope is not intended to be limited by the embodiments described and illustrated herein.

General Description of Embodiments

In one embodiment, a measuring instrument with coupled antenna is disclosed. The measuring instrument comprises a planar substrate. The planar substrate is configured to extend along a longitudinal plane having a first side and a second side opposite the first side. An antenna element is coupled the planar substrate. An antenna connector is also coupled to the planar substrate and additionally coupled to the antenna element. At least a portion of the planar substrate comprises indicia wherein said indicia collectively forms the measuring instrument.

In some embodiments, the antenna element may be configured to operate with a frequency range between and inclusive of 600 MHz and 6000 MHz.

In some embodiments, the measuring instrument may comprise a plurality of antenna elements, wherein each of the plurality of antenna elements is coupled to the planar substrate.

Generally, embodiments having the plurality of antenna elements may additionally comprise a plurality of antenna connectors, wherein each of the plurality of antenna connectors is coupled to one of the plurality of antenna elements.

In some embodiments, the measuring instrument may comprise a single type of measuring instrument such as a ruler (metric and/or inch), protractor, or set square. Other types of measuring instruments may be used as can be appreciated by one having ordinary skill in the art. In other embodiments, the measuring instrument comprises two or more types of measuring instruments. For example, and without limitation, in some embodiments the measuring device comprises a metric ruler, an inch rule, and a protractor.

The antenna element may be embedded within the planar substrate. Alternative ways of coupling the antenna element to the planar substrate may include antenna elements printed on the planar substrate and surface mount antenna elements disposed on the first and/or second side. Other ways of coupling the antenna element to the planar substrate can also be utilized by one having ordinary skill in the art.

In some embodiments, the antenna connector may be disposed on the first side of the planar substrate.

In another embodiment a measuring instrument including an antenna element coupled therewith is disclosed.

A function of the measuring instrument with coupled antenna is to provide a tool that can be utilized by people, such as electrical engineers, for testing and design. The invention is further differentiated by having one or more antenna connectors which can allow for convenient connection with a receiver or transmitter.

Manufacturing

The antenna element can be obtained commercially, for example and without limitation 2JE15b Antenna (https://www.2j-antennas.com/antennas/single-internal-antennas/2je15b-433-mhz-ism-compact-size-surface-mount-ceramic-antenna/187). Alternatively, the antenna element may be any that is customized in accordance with the level and knowledge of one having ordinary skill in the art.

Generally, the planar substrate is a printed circuit board made of industry standard material such as FR-4, Kapton or Pyralux. Otherwise, the planar substrate can be fabricated in accordance with the level and knowledge of one having ordinary skill in the art. Other examples without limitation include more specialized materials such as Duroid, Taconic, and LDS.

The antenna connector can be obtained commercially, for example and without limitation 2911-40024 (https://www.digikey.com/en/products/detail/amphenol-sv-microwave/2911-40024/13158539). Various antenna connectors may be used including SMA, RP-SMA, BNC, TNC, MCX, SMB, MMCX, RCA, FME, DIN, APC-7 or other RF connectors. The antenna connectors can be a male or female variant.

Each of the components of the measuring instrument with coupled antenna and the various embodiments disclosed herein may be manufactured and/or assembled in accordance with the conventional knowledge and level of a person having ordinary skill in the art.

Definitions

For purposes herein the term "measuring instrument" means a device to measure a physical quantity. Examples may include, without limitation, a ruler, a protractor, a set square, and a wire gauge.

The term "indicia" means signs, indications, or distinguishing marks. Indicia may include, numbers, letters, lines, and any other type of marking commonly used with a particular measuring instrument.

The term "antenna element" means a device used to transmit or receive electromagnetic waves.

The term "planar substrate" means a flat or nearly flat surface that contains a conducting portion.

First Illustrated Embodiment

Now turning to the drawings, FIG. 1 shows a perspective view of a measuring instrument (100) in accordance with a first illustrated embodiment. The measuring instrument comprises a planar substrate (110) which is configured to extend along a longitudinal plane. The planar substrate includes a first side (111) and a second side (not shown) opposite the first side. The measuring instrument comprises indicia (140) that collectively form a metric ruler (101) and an inch ruler (102). An antenna element (FIG. 2, 120) is embedded within the planar substrate. Coupled to the antenna element and further coupled to the planar substrate is an antenna connector (130). The antenna connector is configured to connect to a receiver and/or transmitter, thereby having the antenna element receive and/or transmit electromagnetic waves. The antenna connector shown is an MMCX connector, however other types of RF connectors may also be used. The antenna connector is shown disposed at a center portion of the first side. However, the antenna connector may be disposed at alternative locations including the second side or size and edges of the planar substrate.

Figure 2:
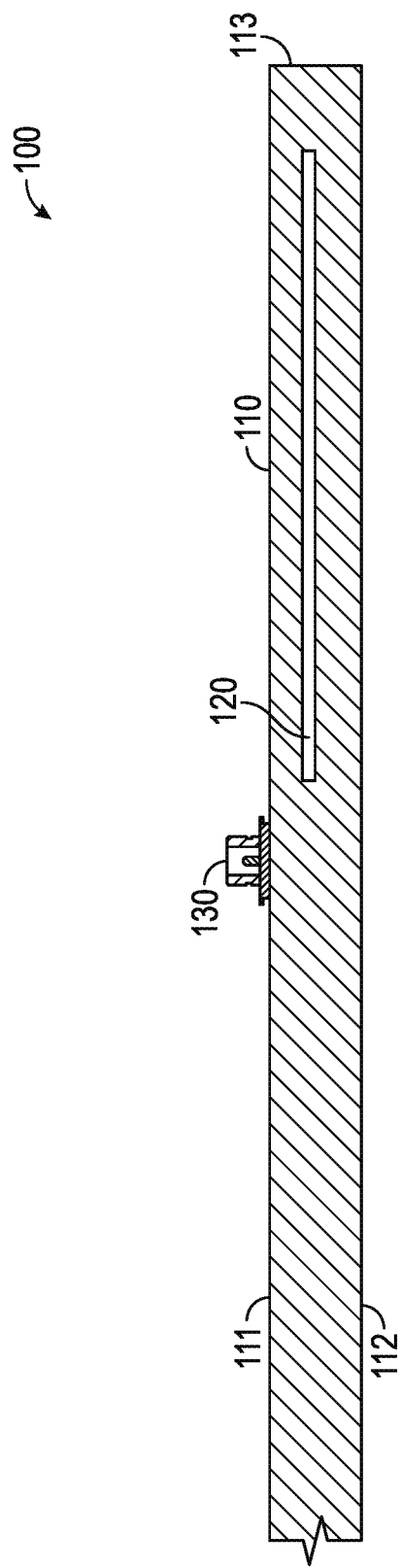
FIG. 2 shows a cross-section side view of the measuring instrument in accordance with the first illustrated embodiment.

FIG. 2 shows a cross-section side view of the measuring instrument (100) in accordance with the first illustrated embodiment. The measuring instrument comprises a planar substrate (110) having a first side (111) and a second side (112). Disposed on the first side is an antenna connector (130). An antenna element (120) is embedded with the planar substrate, the antenna element being electrically coupled to the antenna connector. The planar substrate further includes a thickness (113).

Second Illustrated Embodiment

Figure 3:
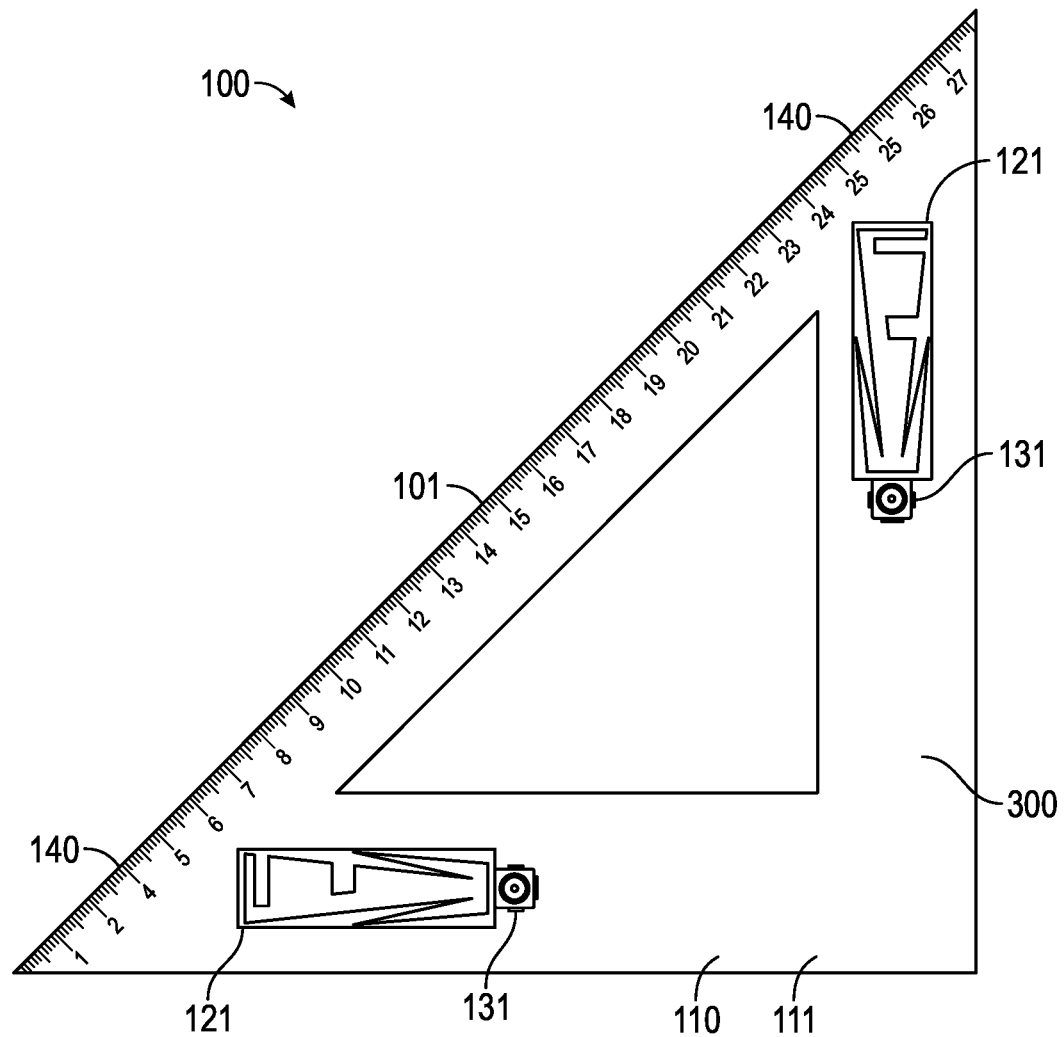
FIG. 3 shows a front view of the measuring instrument in accordance with a second illustrated embodiment.

FIG. 3 shows a front view of the measuring instrument (100) in accordance with a second illustrated embodiment. The measuring instrument comprises a planar substrate (110) having a first side (111). Coupled to the planar substrate is a plurality of antenna elements (121). Additionally, a plurality of antenna connectors (131) is also coupled to the planar substrate wherein each of the plurality of antenna connectors is coupled to one of the plurality of antenna elements. Disposed on the planar substrate are indicia which when combined form a metric ruler (101). The planar substrate also comprises a geometry such that the measuring instrument further comprises a set square (300). The set square provides a user with a right angle or other particular planar angle to a baseline.

FIG. 3 shows the plurality of antenna elements (121) being printed on the planar substrate (110). In other embodiments, the plurality of antenna elements may also comprise embedded antennas within the planar substrate, surface mount antennas, and/or alternative ways o coupling the plurality of antenna elements to the planar substrate.

Third Illustrated Embodiment

Figure 4:
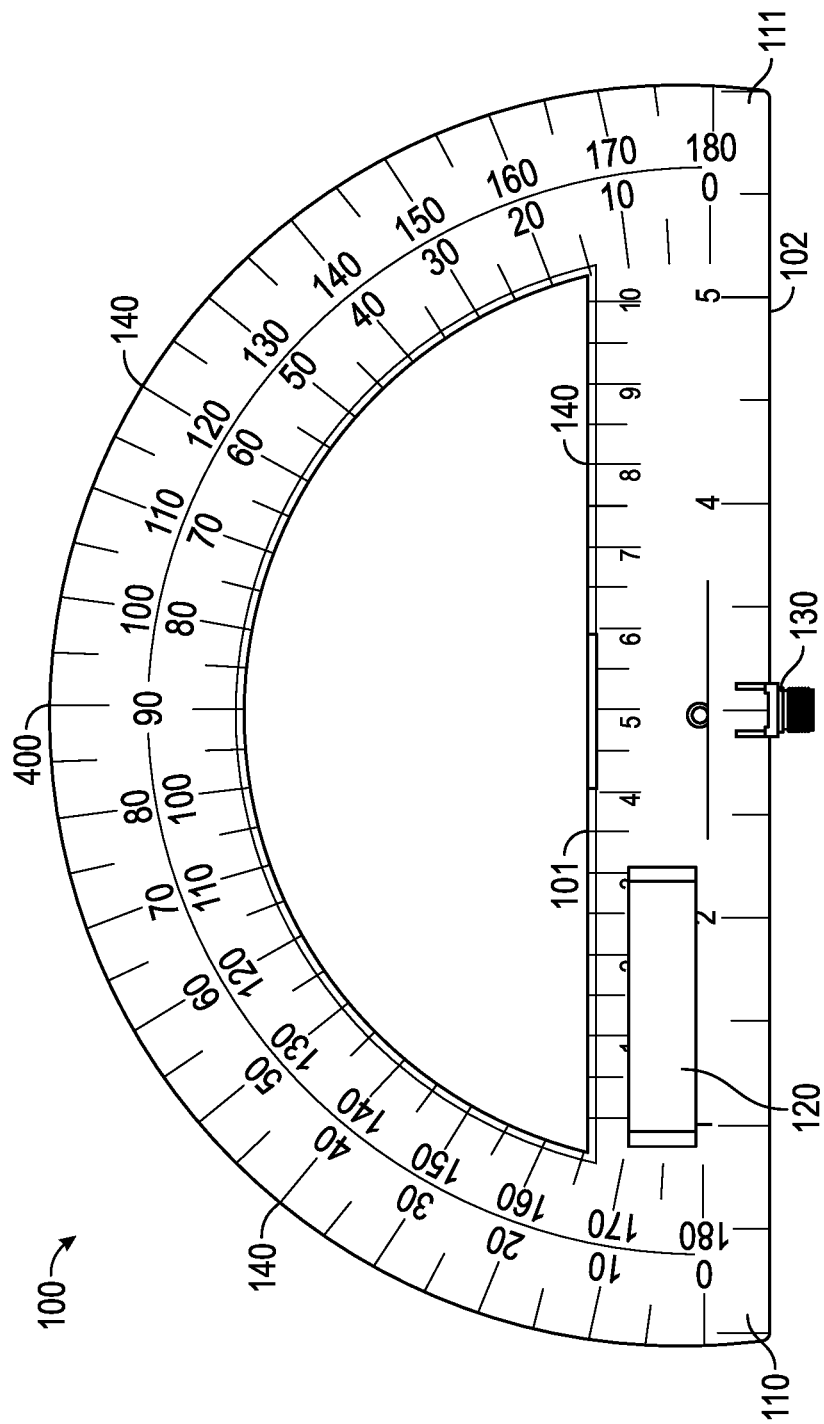
FIG. 4 shows a front view of the measuring instrument in accordance with a third illustrated embodiment.

FIG. 4 shows a front view of the measuring instrument (100) in accordance with a third illustrated embodiment. The measuring instrument comprises a planar substrate (110) having a shape, which along with indicia (140) form a protractor (400). An antenna element (120) and an antenna connector (130) are each coupled to the planar substrate at a first side (111). The antenna element and antenna connector are electrically coupled to each other. The antenna element shown is a surface mount antenna disposed on the planar substrate.

The measuring instrument (100) further comprises indicia near a bottom portion of the planar substrate (110) that form a metric ruler (101) and an inch ruler (102).

Figure 5:
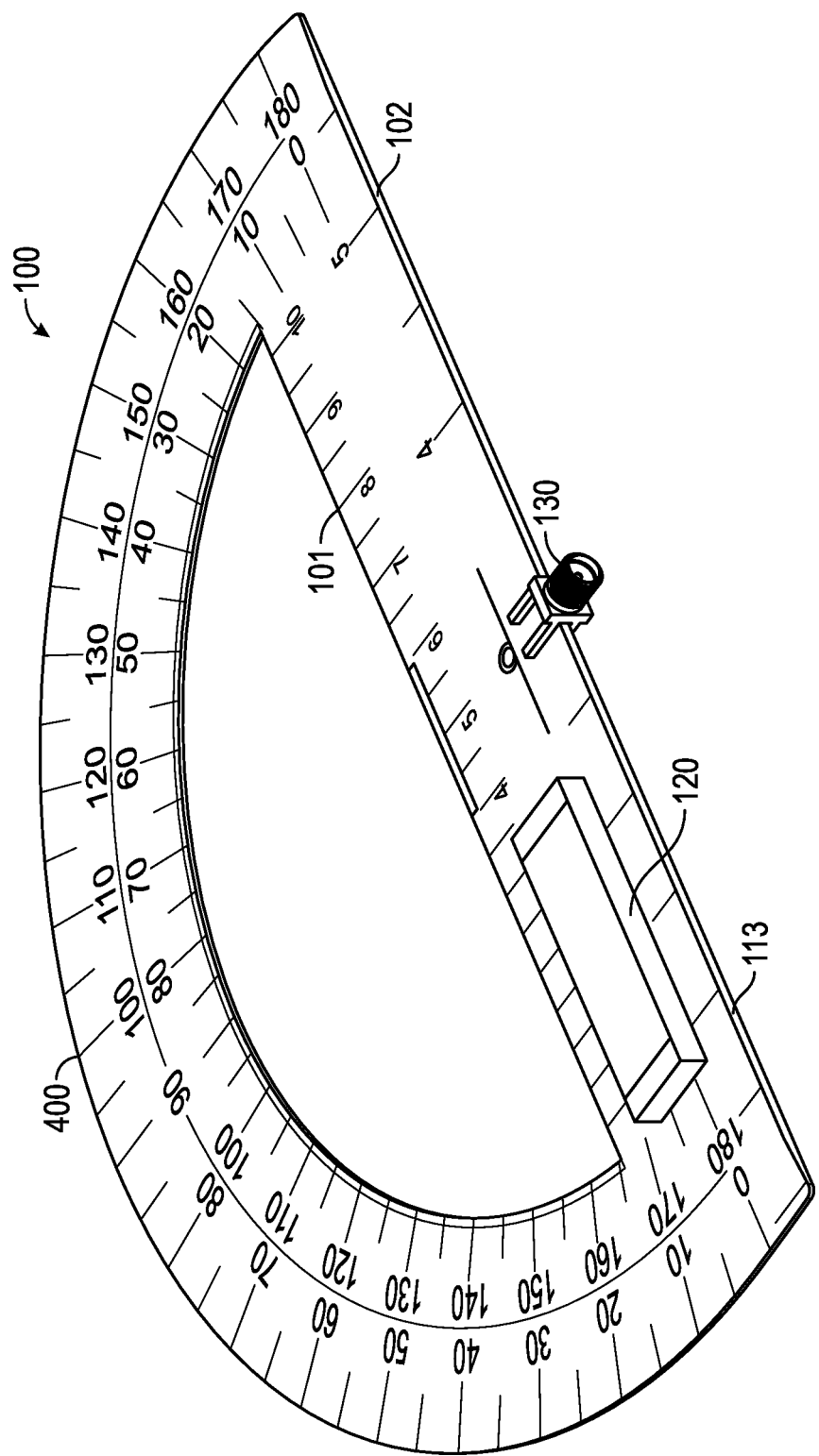
FIG. 5 shows a perspective view of the measuring instrument in accordance with the third illustrated embodiment.

FIG. 5 shows a perspective view of the measuring instrument (100) in accordance with the third illustrated embodiment. The measuring instrument includes a planar substrate (110) comprising a protractor (400), a metric ruler (101) and an inch ruler (102). The planar substrate has a thickness (113) that can be appreciated by one having ordinary skill in the art which is comparable to that of an electronic circuit board. The measuring instrument further comprises an antenna element (120) coupled to the planar substrate; the antenna element is further coupled to an antenna connector (130).

FEATURE LIST measuring instrument (100)
metric ruler (101)
inch ruler (102)

planar substrate (110)
first side (111)
second side (112)
thickness (113)
antenna element (120)
plurality of antenna elements (121)
antenna connector (130)
plurality of antenna connectors (131)
indicia (140)
set square (300)
protractor (400)

What is claimed is:

1. A measuring instrument with coupled antenna comprising:
 a planar substrate,
  the planar substrate configured to extend along a longitudinal plane and having a first side and a second side opposite the first side;
 an antenna element coupled to the planar substrate;
 an antenna connector disposed on the first side and further coupled to the antenna element wherein the antenna connector is disconnected from a radio; and
 at least a portion of the planar substrate comprising indicia wherein said indicia collectively forms the measuring instrument.

2. The measuring instrument of claim 1, wherein the antenna element is configured to operate with a frequency range between and inclusive of 600 MHz and 6000 MHz.

3. The measuring instrument of claim 1, wherein each of a plurality of antenna elements is coupled to the planar substrate.

4. The measuring instrument of claim 3, further comprising a plurality of antenna connectors, wherein each of the plurality of antenna connectors is coupled to one of the plurality of antenna elements.

5. The measuring instrument of claim 1, wherein the measuring instrument comprises: a metric ruler, an inch ruler, and a protractor.

6. The measuring instrument of claim 1, wherein the antenna element is embedded within the planar substrate.

7. The measuring instrument of claim 1, wherein the indicia are disposed on the first side.

8. The measuring instrument of claim 1, wherein the indicia are disposed on the second side.

9. The measuring instrument of claim 1, wherein the antenna connector is disposed at a center portion of the first side.

10. The measuring instrument of claim 1, wherein the measuring instrument comprises a ruler, a protractor, or a set square.

11. The measuring instrument of claim 1, wherein the antenna element comprises a printed antenna, a surface amount antenna, or an embedded antenna.

12. A measuring instrument with coupled antenna comprising:
 a planar substrate,
  the planar substrate configured to extend along a longitudinal plane and having a first side and a second side opposite the first side;
 an antenna element embedded within the planar substrate;
 an antenna connector coupled to the first side, the antenna connector being conductively coupled to the antenna element wherein the antenna connector is externally accessible from the measuring instrument; and
 indicia disposed on the planar substrate wherein said indicia collectively forms the measuring instrument;
 wherein the externally accessible antenna connector is disconnected from a transmitter or a receiver.

13. The measuring instrument of claim 12, wherein the indicia are disposed on the first side.

14. The measuring instrument of claim 12, wherein the indicia are disposed on the second side.

15. The measuring instrument of claim 12, wherein the measuring instrument comprises a ruler, a protractor, or a set square.

* * * * *